Oct. 8, 1963   V. HELLSTERN   3,106,378
QUICK CONNECT, VALVED COUPLING
Filed Dec. 27, 1960

INVENTOR.
VERNON HELLSTERN
BY Cohn and Powell
ATTORNEY.

3,106,378
QUICK CONNECT, VALVED COUPLING
Vernon Hellstern, Glendale, Mo., assignor to Stile-Craft Manufacturers, Inc., St. Louis, Mo., a corporation of Missouri
Filed Dec. 27, 1960, Ser. No. 78,748
12 Claims. (Cl. 251—149.9)

This invention relates generally to improvements in a coupling, and more particularly to improvements in a hose coupling that can be quickly and easily connected or disconnected.

In the heretofore conventional type of quick connect-disconnect coupling, the plug of the male member directly actuated a valve mechanism when inserted into the socket of the cooperating female member, whereby to permit flow of fluid under pressure through the coupling members. In this type of coupling, the valve mechanism is opened before the plug is latched in position. This condition requires a great deal of effort, depending upon the magnitude of the pressure involved in the system, to force the plug inwardly against such pressure until the plug is latched.

Another disadvantage present in the usage of this type of coupling is caused by the fact that the latching sleeve cooperates with radially moving locking elements upon reciprocating movement of the sleeve on the female member to release the plug while the plug is subjected to fluid pressure. This pressure tends to eject the male member forcibly from the female member.

Of course, it will be readily realized that this situation could be very dangerous to the operator directly manipulating the coupling or to anyone within the immediate vicinity. For example, if the latch sleeve were accidentally jarred sufficiently to unlatch the plug, the fluid pressure could throw the male member and its connected hose a considerable distance, and thereby possibly strike and inflict serious injury to any one in the danger zone.

It is a major objective of the present invention to eliminate the above described functional disadvantages by providing a quick connect-disconnect coupling in which the coacting members are latched together before the valve mechanism is automatically opened, and conversely in which the valve mechanism is automatically closed before the coupling members are unlatched.

An important object is achieved by the provision of a reciprocally mounted sleeve on the female member that actuates the latch means to lock the plug in place and also actuates the valve mechanism to place the connected coupling members in communication for flow of fluid under pressure.

Another important object is realized by providing a partition across the tubular body of the female member to form a socket adapted to receive the plug of the male member, and by providing at least one valve port in the body on each side of the partition and underlying the reciprocally mounted sleeve. The sleeve includes a recess that places the valve ports in communication when the sleeve is moved to one limit in which the sleeve effectuates latching of the plug in the socket. Other advantages are afforded by providing a sealing member on the sleeve that engages the body between the valve ports to disrupt flow therebetween when the sleeve is moved to its other limit in which the sleeve effectuates unlatching of the plug.

Still another important object is achieved by providing a plurality of locking elements peripherally about the socket, the locking elements being engageable by the sleeve to cam the elements into locking engagement with the plug located in the socket, incident to movement of the sleeve to one position. The sleeve in another position enables the locking elements to move out of locking engagement from the plug.

Yet another important objective is realized in that the sleeve overlies the locking elements and holds such elements in locking position before the sealing member carried by the sleeve disengages the body region between the valve ports. A slight additional movement of the sleeve to its one limit disengages the sealing member from this region and causes the ports to be placed in communication.

An important objective is realized in providing a quick connect-disconnect coupling that is simple and durable in construction, economical to manufacture and assemble, efficient in operation, and which can be readily operated by anyone without any instruction.

The foregoing and numerous other objects and advantages of the invention will more clearly appear from the following detailed description of a preferred embodiment, particularly when considered in connection with the accompanying drawing, in which.

Figure 1:
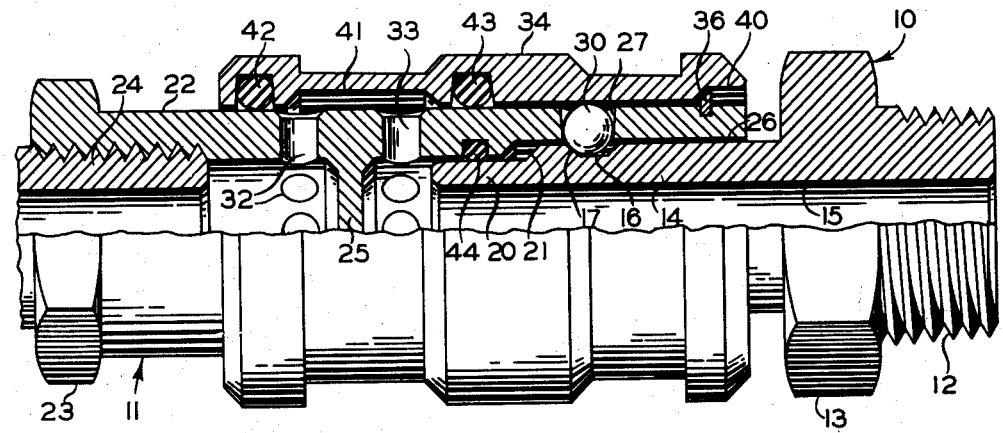
FIG. 1 is a side elevational view of the coupling, partly in cross section as seen along a vertical plane passed through the longitudinal axis, the actuating sleeve being moved to its latched, valve-open position.

Referring now by characters of reference to the drawing, and first to FIG. 1, it will be seen that the quick connect-disconnect coupling includes a male member generally indicated at 10 and a cooperating female member referred to at 11.

The male member 10 consists of a threaded fitting 12 adapted to be connected selectively to a hose or other similar line to a fluid system. A nut 13 formed integrally with fitting 12 facilitates attachment of the male member 10 to its associated hose. Extending forwardly from and formed integrally with nut 13 is a plug 14. The male member 10 is tubular as provided by a longitudinal passageway 15 extending through plug 14, nut 13 and fitting 12.

An annular groove 16 is provided about the periphery of plug 14. The forwardmost margin defining the groove 16 is inclined forwardly to provide a cam shoulder 17. The plug 14 is provided with a reduced end portion 20 and a rearwardly inclined cam shoulder 21.

The female member 11 includes a tubular body 22, the rearmost end of which includes an integral nut 23. The interior of this rear end of body 22 is threaded to receive a fitting 24 adapted to connect its associated hose with the female member 11.

Formed across the body 22 at a distance spaced inwardly from its forward end, is a partition 25 that divides the internal bore. The partition 25 provides a socket 26 forwardly of the partition which is adapted to receive the plug 14.

The latch mechanism includes a plurality of spaced apertures formed peripherally about the body 22 and communicating with the socket 26. In the preferred embodiment, a total of six apertures 27 are provided which are located in 60 degrees relationship. It will be noted that the apertures 27 are tapered inwardly toward the socket for reasons which will later appear.

Located in each of the apertures 27 is a ball 30 constituting a locking element. The locking balls 30 are adapted to move radially into and out of the socket 26.

However it will be noted that the tapered apertures 27 engage the balls 30 to prevent the balls from falling freely into the socket 26.

The valve mechanism includes a first series of regularly spaced valve ports 31 formed peripherally about the body 22 immediately to the rear of partition 25. In the preferred embodiment, a total of eight valve ports are provided at 45 degrees relation.

A corresponding series of valve ports 33 are formed in body 22 immediately in front of partition 25. These valve ports 33 are arranged just to the rear of the reduced end portion 20 of plug 14 when the plug 14 is inserted into socket 26 so as to provide a direct communication with the passageway 15 through such plug.

Figure 3:
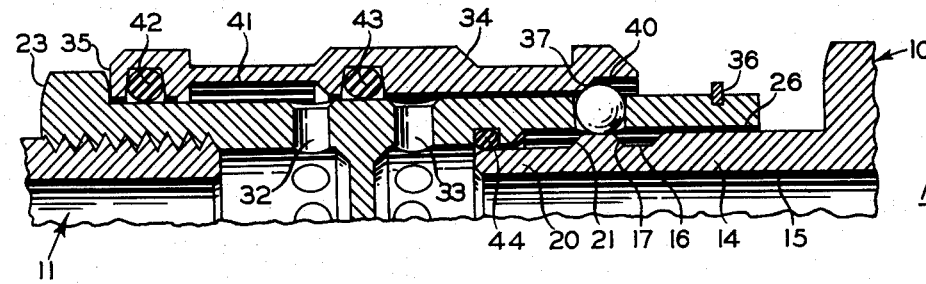
FIG. 3 is a fragmentary cross sectional view similar to FIG. 2, but illustrating the actuating sleeve in its unlatched, valve-closed position.
Figure 4:
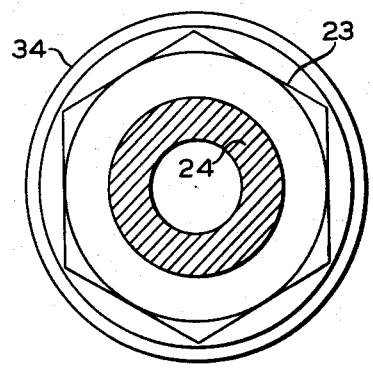
FIG. 4 is an end elevational view as seen from the left of FIG. 1.

The mechanism for effectively and operatively actuating the latch and the valve in this coupling consists of a sleeve 34 slidably mounted on body 22 for reciprocating movement between limits. The rearmost limit of sleeve 34 is defined by the abutment of the rear end 35 of sleeve 34 with nut 23 as is best seen in FIG. 3. A retaining ring 36 is attached to the front end of body 22 and is adapted to engage a camming shoulder 37 formed on sleeve 34 to determine its forwardmost limit.

The front end of sleeve 34 is provided with a shallow, annular recess 40 partially defined at its rear by the cam shoulder 37. The depth of the front recess 40 is sufficient to allow the locking balls 30 to move outwardly of the body 22 to disengage operatively from plug 14 when the sleeve 34 is located in its fully retracted position illustrated in FIG. 3.

Formed entirely at the rear of sleeve 34 is a valve recess 41 of sufficient length to bridge the valve ports 32 and 33 when the sleeve 34 is located in its fully extended position illustrated in FIG. 1. This valve recess 41 places the valve ports 32 and 33 in direct communication.

At each end of the valve recess 41, the sleeve 34 is provided with an annular groove. These grooves are adapted to receive O-rings 42 and 43 constituting sealing members. The O-rings 42 and 43 are resilient and engage the periphery of body 22 in sealing relation.

When the sleeve 34 is fully extended as shown in FIG. 1, the O-rings 42 and 43 engage the body 22 on opposite sides of the valve ports 32 and 33, thereby precluding leakage of fluid under pressure between the body 22 and sleeve 34, and enabling the flow of fluid under pressure to follow the path directly through valve ports 32, valve recess 41, through valve port 33 and thence into the socket 26.

When the sleeve 34 is fully retracted as shown in FIG. 3, the O-ring 43 engages the body region between the valve ports 32 and 33 to disrupt flow between such valve ports. Again, the pair of O-rings 42 and 43 preclude escape or leakage of fluid under pressure between the body 22 and sleeve 34.

The interior of body 22 is provided with an annular groove at its socket 26, the groove being adapted to receive and position an O-ring 44. The O-ring 44 is adapted to engage the reduced end portion 20 of plug 14 when the plug is inserted into socket 26 to provide a seal between the plug 14 and body 22.

It is thought that the operation and functional advantages of the coupling has become fully apparent from the foregoing detailed description of parts, but for completeness of disclosure the connection and disconnection of the coupling members will be briefly described.

It will be assumed that the coupling members 10 and 11 are detached and that the sleeve 34 is in the fully retracted position illustrated in FIG. 3. In this position of sleeve 34, the front recess 40 is aligned directly opposite the locking balls 30 and the O-ring 43 is located between the valve ports 32 and 33. Flow of fluid under pressure through the female coupling member 11 is prevented by the particular location of the O-ring 43. The fluid is in communication with the valve recess 41 through valve ports 32, but cannot flow between the body 22 and sleeve 34 because of the sealing relationship of O-rings 42 and 43.

First, the plug 14 is inserted into body socket 26. As the plug 14 moves inwardly, the camming shoulder 21 engages the locking balls 30 to move the balls 30 outwardly into the front recess 40 of sleeve 34. Because the sleeve 34 overlies the balls 30, the balls 30 are retained in the body apertures 27. Next, the O-ring 44 engages the reduced plug end 20 to provide a seal. When fully inserted, the groove 16 is aligned radially with the locking balls 30.

It will be importantly noted that during this insertion of plug 14 the valve mechanism remains closed, and consequently the plug 14 is not subjected to any fluid pressure.

Figure 2:
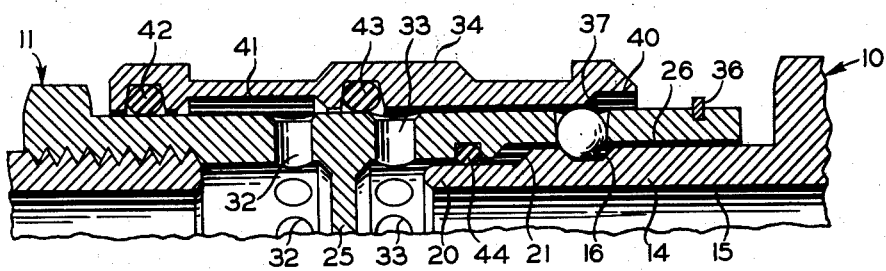
FIG. 2 is a fragmentary cross sectional view similar to FIG. 1, but illustrating the actuating sleeve in its latched, valve-closed position.

After the plug 14 is fully inserted, the actuating sleeve 34 is moved forwardly. During this forward movement of the sleeve 34, the cam shoulder 37 engages the locking balls 30 and moves the balls 30 inwardly into socket 26 and into the plug groove 16, as is best shown in FIG. 2. The sleeve 34 overlies the locking balls 30 to hold such balls 30 in latched position.

It will be importantly noted from FIG. 2 that the locking balls 30 are held in the latched position before the O-ring 43 disengages from the body region between the valve ports 32 and 33. Consequently, the valve mechanism remains closed until the latch mechanism is actuated by the sleeve 34. This action assures that the plug 14 will not be subjected to fluid pressure until the plug 14 has been securely latched to the body 22.

As the sleeve 34 continues its forward movement, the O-ring 43 clears the body region between the valve ports 32 and 33, and in fact begins to ride over the valve ports 33 to the opposite side. The sleeve 34 is moved to the extended position as determined by the abutment of cam shoulder 37 with the retaining ring 36, as is illustrated in FIG. 1. In this fully extended position, the O-rings 42 and 43 engage the body 22 on opposite sides of the valve ports 32 and 33. Moreover, the valve ports 32 and 33 are placed in direct communication by the valve recess 41. Fluid is now allowed to flow under pressure from the female member line outwardly through the valve ports 32 into the passageway afforded by the valve recess 41, thence into the socket 26 through the valve ports 33, and thence through the passageway 15 formed in the male member 10.

Disconnection of the coupling members 10 and 11 is accomplished by the mere reversal of the above described procedure. For example, the sleeve 34 is moved rearwardly from its fully extended position until the O-ring 43 crosses the valve port 33 and sealingly engages the body region between valve ports 32 and 33, whereby to stop fluid flow through the coupling. The locking balls 30 are maintained in their latched position by engagement with the overlying sleeve 34 until the valve mechanism is effectively closed. Upon continued rearward movement of the sleeve 34, the front recess 40 of sleeve 34 is aligned directly and radially opposite the locking balls 30 as is disclosed in FIG. 3. It will be importantly noted that because the plug 14 is not subjected to any fluid pressure there is no likelihood that the plug 14, or in other words the male member 10, will be forcibly ejected from the female socket 26.

When the sleeve 34 is located in its fully retracted position as determined by engagement of rear sleeve end 35 with nut 23, the plug 14 is withdrawn from the socket 26 by the operator. As the plug 14 is moved outwardly, the cam shoulder 17 forces the locking balls 30 radially outward of the apertures 27 into the front sleeve recess 40. The locking balls 30 then ride over the periphery of the plug 14 as the plug is fully withdrawn.

Although the invention has been described by making detailed reference to a single preferred embodiment, such detail is to be understood in an instructive, rather than in any restrictive sense, many variants being possible within the scope of the claims hereunto appended.

I claim as my invention:

1. In a coupling, a male member including a tubular plug, a female member including a tubular body providing a socket adapted to receive said plug, latch means carried by said body selectively engageable with said plug, valve means at least partially in said body, a sleeve slidably mounted on said body for movement to different positions relative to said body, means interconnecting said sleeve with said valve means, and means interconnecting said sleeve with said latch means, the same said sleeve actuating both said valve means and said latch means automatically and selectively upon movement to said positions.

2. In a coupling, a male member including a tubular plug, a female member including a tubular body provided with a socket adapted to receive said plug, latch means carried by said body and selectively engageable with said plug, a valve means at least partially in said body, and a sleeve slidably mounted on said body for movement to different positions relative to said body, means operatively interconnecting said sleeve with said valve means, and means operatively interconnecting said sleeve with said latch means, the same said sleeve actuating both said valve means and said latch means as the sleeve is moved to one position to latch the plug and subsequently to allow flow through said members, and actuating said valve means and said latch means as the sleeve is moved to another position so as to stop the flow through said members and subsequently to unlatch the plug.

3. In a coupling, a male member including a tubular plug provided with a peripheral groove, a female member including a tubular body, a partition across said tubular body providing a socket adapted to receive said plug, a plurality of locking elements carried loosely by the body peripherally about said socket, a sleeve slidably mounted on said body for movement to different positions relative to said body, said sleeve being operatively engageable with said locking elements upon movement to one position, said body being provided with valve ports at each side of said partition, and means carried by the same said sleeve placing said valve ports selectively in communication to allow flow through said members as the sleeve is moved past the said one position in which the sleeve moves the locking elements inwardly into the socket and into the peripheral groove of the plug, whereby to latch the plug.

4. In a coupling, a male member including a tubular plug provided with a peripheral groove, a female member including a tubular body, a partition across said tubular body providing a socket adapted to receive said plug, a plurality of locking elements carried loosely by the body peripherally about said socket, a sleeve slidably mounted on said body for movement to different positions relative to said body, said sleeve engaging said locking elements upon movement to one position to move the locking elements inwardly into the socket and into the peripheral groove of the plug, whereby to latch the plug, said body being provided with valve ports at each side of said partition, and means carried by the same said sleeve placing said valve ports selectively in communication to allow flow through said members as the sleeve is moved past the said one position in which the sleeve moves the locking elements inwardly into latch position, said sleeve placing said valve ports in communication just after moving the locking elements into latch position upon continued movement of the sleeve past the said one position, and said sleeve closing the valve ports just before unlatching the lock elements upon movement of the sleeve in the other direction past the said one position.

5. In a coupling, a male member including a tubular plug, a female member including a tubular body provided with a socket adapted to receive said plug, latch means carried by the body and selectively engageable with said plug, a sleeve slidably mounted on said body for movement to different positions relative to said body, a valve means between said body and said sleeve, means operatively interconnecting said sleeve with said valve means, and means operatively interconnecting the same said sleeve with said latch means, the same said sleeve actuating both said valve means and said latch means as the sleeve is moved to one position to latch the plug and to allow flow through said members, said sleeve opening said valve means just after locking the latch means, the same said sleeve actuating both said valve means and said latch means as the sleeve is moved to another position to unlatch the plug and stop the flow through said members, said sleeve closing said valve means just before unlocking the latch means.

6. In a coupling, a male member including a tubular plug, a female member including a tubular body, a partition across said tubular body to provide a socket forwardly of said partition adapted to receive said plug, latch means carried by said body and selectively engageable with said plug, a sleeve movably mounted on said body, said sleeve engaging said latch means to latch the plug in said socket when moved to one position and operatively disengaging from said latch means to unlock the plug when moved to another position, the body being provided with at least one valve port on each side of said partition, the same said sleeve being provided with a recess that spans the valve ports to place said members in communication when said sleeve is in latched position, and sealing means on said sleeve engaging the body between the valve ports to shut off communication through said members when said sleeve in unlatched position.

7. In a coupling, a male member including a tubular plug, a female member including a tubular body, a partition across said tubular body to provide a socket forwardly of said partition adapted to receive said plug, latch means carried by said body and selectively engageable with said plug, a sleeve movably mounted on said body, said sleeve operatively engaging said latch means to latch the plug in said socket when moved to one position and operatively disengaging from said latch means to unlatch the plug when moved to another position, the body being provided with at least one valve port on each side of said partition, the same said sleeve being provided with a recess that spans the valve ports to place said members in communication when said sleeve is in locked position, and sealing means carried by said sleeve on each side of said recess engaging the body, one of said sealing means engaging the body between said valve ports to shut off communication through said members when said sleeve is in unlatched position.

8. In a coupling, a male member including a tubular plug, a female member including a tubular body, a partition across said tubular body to provide a socket forwardly of said partition adapted to receive said plug, latch means carried by said body and selectively engageable with said plug, a sleeve movably mounted on said body, said sleeve operatively engaging said latch means to latch the plug in said socket when moved to one position and operatively disengaging from said latch means to unlatch the plug when moved to another position, the body being provided with at least one valve port on each side of said partition, the same said sleeve being provided with a recess that spans the valve ports to place said members in communication when said sleeve is in latched position, and sealing means on one side of said recess engaging the body between the valve ports to shut off communication through said members when said sleeve is in unlatched position, said sealing means disengaging from the body between the valve ports and said recess bridging said ports only when the sleeve has actuated the latch means to latch the plug, and said sealing means engaging the body between the valve ports to shut off communication before said sleeve actuates the latch means to unlatch the plug.

9. In a coupling, a male member including a tubular plug, a female member including a tubular body, a partition across said tubular body to provide a socket forwardly of said partition adapted to receive said plug, locking elements carried loosely by said body, said locking elements being selectively movable into said socket and into connection with said plug, a sleeve movably mounted on said body, said sleeve camming said locking elements into said socket when moved to one position and enabling said locking elements to move effectively out of said socket when said sleeve is moved to another position, the body being provided with at least one valve port on each side of said partition, the same said sleeve being provided with a recess that spans the valve ports to place said members in communication only upon further movement of said sleeve in latched position, and sealing means on said sleeve engaging the body between the valve ports to shut off communication through said members before said sleeve moves out of the unlatched position.

10. In a coupling, a male member including a tubular plug, a female member including a tubular body, a partition across said tubular body to provide a socket forwardly of said partition adapted to receive said plug, a plurality of locking elements carried loosely by said body, said locking elements being selectively movable into said socket and into connection with said plug, a sleeve movably mounted on said body, means interconnecting said sleeve and body to determine the limits of such relative movement, said sleeve camming the locking elements inwardly into said socket and into connection with said plug upon movement of said sleeve to one position, the body being provided with at least one valve port on each side of said partition, said valve ports underlying said movable sleeve, the same said sleeve being provided with a recess that spans the valve ports to place said members in communication upon further movement of said sleeve past said one position yet while maintaining said locking elements latched, and sealing means on said sleeve engaging the body between the valve ports to shut off communication through said members upon movement of the sleeve in the opposite direction before the locking elements are unlatched.

11. In a coupling, a male member including a tubular plug provided with a peripheral groove, a female member including a tubular body, a partition across said tubular body to provide a socket forwardly of said partition adapted to receive said plug, a plurality of locking elements carried loosely by said body and peripherally about said socket, a sleeve movably mounted on said body, said sleeve engaging said locking elements to move said locking elements inwardly of said socket and into said plug groove whereby to latch said plug in said socket when said sleeve is moved in one direction to one position, and said sleeve operatively disengaging from said locking elements to permit such elements to move out of said plug groove whereby to unlatch the plug when said sleeve is moved in the opposite direction from said one position, the body being provided with a plurality of valve ports on each side of said partition, said valve ports underlying said sleeve, the same said sleeve being provided with a recess that spans the valve ports to place said members in communication when said sleeve is in plug-latched position, a pair of O-rings carried by said sleeve, one O-ring being located on each side of said recess and sealingly engaging the body, one of said O-rings engaging the body between said valve ports to shut off communication through said members when said sleeve is in plug-unlatched position, the last said O-ring disengaging from the body between the valve ports and said recess bridging said valve ports only after the sleeve has cammed the locking elements inwardly to latch the plug upon further movement of the sleeve in said one direction past said one position, and the last said O-ring engaging the body between the ports to shut off communication upon movement of the sleeve in the opposite direction toward the said one position and hence before the sleeve permits the locking elements to disengage from the plug groove.

12. In a coupling, a male member including a tubular plug, a female member including a tubular body providing a socket adapted to receive said plug, locking elements carried loosely by said body and selectively movable into engagement with said plug, a sleeve movably mounted on said body, said sleeve camming said locking elements inwardly of said sleeve and against said plug whereby to lock the plug in said socket when the sleeve is moved in one direction to one position, and said sleeve allowing the locking elements to disengage from said plug whereby to unlatch the plug when the sleeve is moved in the opposite direction from said one position, a valve means between the sleeve and body, said sleeve actuating said valve means as the sleeve is moved in said one direction past said to one position to latch the plug and subsequently to allow flow through said members, and said sleeve actuating said valve means to stop the flow through said members as the sleeve is moved in the opposite direction toward the said one position and before the plug is unlatched.

References Cited in the file of this patent

UNITED STATES PATENTS 1,850,879    Hunt  ---------------- Mar. 22, 1932

FOREIGN PATENTS 1,078,826    Germany  -------------- Mar. 31, 1960